(12) United States Patent
Kubli et al.

(10) Patent No.: US 12,547,792 B2
(45) Date of Patent: Feb. 10, 2026

(54) METHOD FOR ANALYZING A RESULT OF A SIMULATION OF A MANUFACTURING PROCESS

(71) Applicant: AutoForm Engineering GmbH, Pfäffikon SZ (CH)

(72) Inventors: Waldemar Kubli, Pfäffikon SZ (CH); Andreas Krainer, Pfäffikon SZ (CH)

(73) Assignee: AutoForm Engineering GmbH, Pfäffikon (CH)

( * ) Notice: Subject to any disclaimer, the term of this patent is extended or adjusted under 35 U.S.C. 154(b) by 1248 days.

(21) Appl. No.: 17/304,761

(22) Filed: Jun. 25, 2021

(65) Prior Publication Data

US 2021/0406423 A1     Dec. 30, 2021

(30) Foreign Application Priority Data

Jun. 26, 2020   (CH) .................................. 00774/20

(51) Int. Cl.
| | |
|---|---|
| *G06F 30/20* | (2020.01) |
| *G06F 30/10* | (2020.01) |
| *G06F 113/24* | (2020.01) |
| *G06F 119/14* | (2020.01) |
| *G06F 119/18* | (2020.01) |

(52) U.S. Cl.
CPC .............. *G06F 30/20* (2020.01); *G06F 30/10* (2020.01); *G06F 2113/24* (2020.01); *G06F 2119/14* (2020.01); *G06F 2119/18* (2020.01)

(58) Field of Classification Search
None
See application file for complete search history.

(56) References Cited

U.S. PATENT DOCUMENTS

| | | | |
|---|---|---|---|
| 6,353,768 B1 * | 3/2002 | Karafillis | ................ G06F 30/23 700/145 |
| 6,731,996 B1 * | 5/2004 | MacEwen | ................ C22F 3/00 702/42 |

(Continued)

OTHER PUBLICATIONS

Anup S Atal et al: "Formability Analysis of Deep drawing Process by Finite Element Simulation" Intl J of Science and Research, Jun. 2014, vol. 3, Issue 6, pp. 2153-2156.

(Continued)

*Primary Examiner* — Akash Saxena
(74) *Attorney, Agent, or Firm* — Oppedahl Patent Law Firm LLC

(57) ABSTRACT

A computer-implemented method for analysing a result of a simulation of a manufacturing or deformation process, comprises
  retrieving the result of the simulation, comprising at least the geometry of the part (2) and stress tensors (23) in the part (2) caused by the forming process;
  for one or more starting points (32) in a critical region (22), determining a cause line (3) by following the stress or a corresponding force in the direction in which it is maximal;
  for each cause line (3), determining at least one line section (31) of the cause line (3), and a cause trajectory (5) representing values of a stress or a force directed along the cause line (3);
  and performing at least one of
  presenting information representing the line section (31) and the cause trajectory (5) along the line section (31) to a user; and
  automatically adapting, parameters of the forming process.

16 Claims, 3 Drawing Sheets

(56) References Cited

U.S. PATENT DOCUMENTS

| | | | | |
|---|---|---|---|---|
| 7,392,163 | B1* | 6/2008 | Bindeman | G06F 30/23 703/2 |
| 7,415,400 | B2* | 8/2008 | Zhu | G05B 19/404 703/2 |
| 8,229,712 | B2* | 7/2012 | Hirata | G06F 30/23 703/2 |
| 8,463,583 | B2* | 6/2013 | Kubli | G06F 30/00 700/118 |
| 8,560,103 | B2* | 10/2013 | Kubli | B21D 22/20 700/145 |
| 8,589,132 | B2* | 11/2013 | Miyagi | G06F 30/23 700/98 |
| 9,874,504 | B2* | 1/2018 | Yonemura | G06F 30/20 |
| 10,331,809 | B2* | 6/2019 | Hirose | G06F 30/20 |
| 10,372,849 | B2* | 8/2019 | Oetjens | B21D 53/88 |
| 10,525,518 | B2* | 1/2020 | Watanabe | G06Q 50/04 |
| 10,639,695 | B2* | 5/2020 | Shinmiya | B21D 22/26 |
| 10,670,515 | B2* | 6/2020 | Oetjens | G06F 30/23 |
| 11,016,011 | B2* | 5/2021 | Nitta | G01N 3/28 |
| 11,435,730 | B2* | 9/2022 | Weathers | G05B 19/41885 |
| 11,651,120 | B2* | 5/2023 | Sheng | G06F 30/15 703/2 |
| 11,914,926 | B2* | 2/2024 | Kubli | G06F 30/17 |
| 2008/0004850 | A1* | 1/2008 | Wang | G06F 30/23 703/13 |
| 2009/0056468 | A1* | 3/2009 | Kubli | G06F 30/20 73/826 |
| 2009/0238420 | A1* | 9/2009 | Rongen | A61B 6/504 382/128 |
| 2011/0172803 | A1* | 7/2011 | Suzuki | B21D 22/00 703/2 |
| 2011/0295570 | A1* | 12/2011 | Zhu | G06F 30/23 703/2 |
| 2012/0123579 | A1* | 5/2012 | Kubli | B21D 22/20 700/104 |
| 2012/0123741 | A1* | 5/2012 | Kubli | G06F 30/00 703/1 |
| 2013/0006543 | A1* | 1/2013 | Hiwatashi | G01N 3/00 702/42 |
| 2014/0358268 | A1* | 12/2014 | Kubli | G05B 19/40937 700/97 |
| 2016/0161382 | A1* | 6/2016 | Yonemura | G01N 3/20 73/851 |
| 2020/0082044 | A1* | 3/2020 | Oetjens | B21D 22/20 |
| 2020/0311325 | A1* | 10/2020 | Tanaka | B21D 22/00 |
| 2021/0034711 | A1* | 2/2021 | Sheng | G06F 30/23 |
| 2021/0370377 | A1* | 12/2021 | Stephan | B21D 31/005 |
| 2021/0406423 | A1* | 12/2021 | Kubli | G06F 30/10 |
| 2021/0406431 | A1* | 12/2021 | Kubli | B21D 37/08 |

OTHER PUBLICATIONS

Kahhal Parviz et al: "Multi-objective Optimization of Sheet Metal Forming Die Using Genetic Algorithm", J of Failure Anal and Prev, vol. 13, pp. 771-778, Sep. 28, 2013.

Ablat Muhammad Ali et al: "Numerical simulation of sheet metal forming: a review" The Intl J of Advanced Manufacturing Technology Jul. 23, 2016, vol. 89, pp. 1235-1250.

* cited by examiner

METHOD FOR ANALYZING A RESULT OF A SIMULATION OF A MANUFACTURING PROCESS

The invention relates to the field of designing and manufacturing of parts, in particular of sheet metal parts, and tools for their manufacturing. It relates to a method for analysing a result of a simulation of a manufacturing or deformation process as described in the preamble of the corresponding independent claims.

BACKGROUND

It is known, for example, in the context of manufacturing sheet metal parts, to simulate the effects of forming and/or assembly operations. Both in reality and in simulation, undesired defects can occur, such as wrinkling or tearing of the material. In order to eliminate or reduce defects, the design of the part and/or of a tool used to manufacture the part is modified. Also, process conditions such as blank holder forces, the process itself and the materials involved can be modified. There is a need for an analysis method for determining causes of such defects automatically, as an aid for a user and/or for an automated method to modify the design.

It is therefore an object of the invention to create a method for analysing a result of a simulation of a manufacturing or deformation process of the type mentioned initially, for determining causes of defects automatically.

SUMMARY

This object is achieved by the method for analysing a result of a simulation of a manufacturing or deformation process according to the claims. The method is particularly well suited for the manufacturing process being a sheet metal forming process. The method can also be used for analysing the result of a simulation of a deformation of a part, for example, in a simulation of a crash.

The computer-implemented method for analysing a result of a simulation of a manufacturing or deformation process in which a part is manufactured or deformed, in particular from a planar sheet of material, comprises the computer-implemented steps of retrieving the result of the simulation of the manufacturing or deformation process, the result comprising at least the geometry of the part, stress tensors in the part caused by the forming process, and a critical region in the part caused by the forming process;

for one or more starting points in the critical region, determining a cause line by beginning at the starting point and moving, at each point of the cause line, in the direction in which the stress, as defined by the stress tensor in this point, or a corresponding force, is maximal or in which the stress or force is minimal;

for each cause line, determining at least one line section of the cause line, and a cause trajectory associated with the line section, the cause trajectory representing in particular values of a stress or a force directed along the cause line in the line section;

and for the at least one line section, performing at least one of presenting information representing the line section and the cause trajectory along the line section to a user; and automatically adapting, based on the line section and the cause trajectory along the line section, the forming process, in particular the geometry of at least one of the part and the tool, performing a further simulation of the forming process, and iteratively repeating the above steps with the results of the further simulation of the forming process.

The manufacturing process can be a forming process, an assembly process, or a combination of both. The manufacturing process can involve hemming or seaming.

A forming process can be, for example, a metal forming process such as sheet metal forming, casting, forging, extrusion, rolling, etc.

A deformation process can be, for example, a deformation of a part or an assembly of parts in a crash.

In an assembly process, the part being considered is assembled from two or more sub-parts or component parts. Assembling the component parts can cause them to be deformed, and thus can also give rise to defects and related critical regions and the need for determining related causes.

The tool can comprise, for example, a punch and/or a die in a deep drawing press station or in a progressive die or line or transfer press, driven by mechanical, hydraulic or servo actuation.

As a rule, when the part is mentioned without further qualification, it is understood to refer to the part after the forming process.

The geometry of the part describes the geometrical shape of the part. Typically, this is done by means of a finite element method (FEM). The model represents the state of the part, which can comprise at least the part's geometry and internal stresses. The state can be considered to be a result of the simulation.

A critical region can be defined by a region of the part in which certain result variables representing parameters or conditions in the simulated part after forming, or arising during the simulated forming process, exceed corresponding limits. This can mean that the region was determined to be defective, or to be in a condition that may give rise to defects. Such conditions can relate, for example, to excessive thinning or excessive thickening of the part.

Critical regions can be determined, for example, by an analysis of the result of the simulation of the forming process, or in the course of the simulation itself. If more than one critical region is present, the method for determining associated causes can be repeated for each critical region.

In general, the stress tensors can be represented by three-by-three matrices representing three normal stresses and six shear stresses.

In embodiments, the part is modelled essentially as a two-dimensional or sheet-like object extending in three dimensions. Elements of the model are commonly called "shell element". In this case, in the stress tensors, the stress component normal to a shell surface is zero.

For such an object, forces corresponding to stresses are in-plane forces, determined as an integral of stresses over the thickness of the part.

Each cause line comprises two main sections, separated by the starting point for which the cause line is generated. The main sections are generated by moving away from the starting point in opposite directions along the axis of maximum stress in the starting point.

In embodiments, the line section considered, when presenting information to the user, or when automatically adapting parameters of the forming process, comprises a complete main section. In other embodiments, the line section considered is one of two or more non-overlapping subsections of a main section.

In embodiments, the method comprises determining a cause line by moving, at each point of the cause line, in the direction in which the stress, as defined by the stress tensor in this point, or the corresponding force, is maximal.

In this manner it is possible to locate the cause for defects or critical regions related to, for example, thinning or tearing or splitting of the material. Such defects can be counteracted by allowing more material to flow into the corresponding region.

In embodiments, the method comprises determining a cause line by moving, at each point along the cause line, in the direction in which the stress, as defined by the stress tensor in this point, or the corresponding force, is minimal.

This can include directions in which the stress or force is negative, that is, the material of the part is compressed. In this manner it is possible to locate the cause for defects or critical regions related to, for example, thickening or wrinkling in the material. Such defects can be counteracted by allowing less material to flow into the corresponding region. In embodiments, the cause for such defects is also located by moving along the cause line in the direction in which the stress is maximal.

In embodiments, the method comprises, when moving along the cause line a point is reached in which there is no clear direction of maximal stress or force, then determining the next point by moving at least approximately in the same direction as in the preceding step.

In embodiments, the step of, for each cause line, determining at least one line section of the cause line comprises selecting at least one feature of the part and determining the line section as a section of the cause line that lies in a region of the part in which said feature is located.

In embodiments, the method comprises the step of, for each cause line, determining at least one line section of the cause line comprises determining the cause trajectory, performing a segmentation of the cause trajectory into trajectory sections based on changes in the gradient, and determining, for each trajectory section a corresponding line section.

Each point on a cause line is associated with a corresponding point on the cause trajectory, and vice versa. Thus each line section is also associated with a corresponding trajectory section and vice versa.

In embodiments, the result of the simulation of the manufacturing or deformation process is obtained by performing the simulation at least until a simulated defect occurs, and taking the state of the part just before the simulated defect occurs as the result of the simulation for the subsequent steps. Generally, the simulation is continued but the state before the onset of the defect is used for the subsequent steps.

The region of the simulated defect is the critical region. By using the state of the simulated part before the simulation of the occurrence of the defect, the causes for the defect in the corresponding critical region can be determined. If the simulation were to be continued, the defect—such as a tearing of the material—would, depending on the sophistication of the simulation, be simulated. This would cause the corresponding stresses to disappear, and the analysis would no longer be possible. This can be repeated for different defects occurring at different times in the forming process.

In embodiments, the method comprises computing a deep draw effect force $F_{DD}$ acting on a volume element on a cause line in the part as a vector sum of a first force (Fs1) acting at a first face (which also can be called entrance face) of the volume element in the direction of the cause line, a second force (Fs2) acting at a second face (which also can be called exit face) of the volume element in the direction of the cause line, a normal force ($F_N$) acting in a direction normal to the cause line, a friction force ($F_R$) acting in the direction of the cause line and caused by the normal force ($F_N$).

In embodiments presenting information representing the line section and the cause trajectory along the line section to a user comprises displaying a visual representation of values of the cause trajectory overlaid on a visual representation of the part.

In this way it is possible to display relative contributions to the force or stress acting at the critical region on regions of the part itself. A user can quickly identify features of the part or tool or process that are related to a critical region and choose which features to modify.

In embodiments, presenting information representing the line section and the cause trajectory along the line section to a user comprises displaying a visual representation of values of the cause trajectory separately from a visual representation of the part, and displaying visual elements that relate regions on the part to trajectory sections of the cause trajectory In embodiments, labels can be displayed on the representation of the part and also on a graph showing the cause trajectory, with the same label used to identify a line section and a corresponding trajectory section.

In embodiments, numbers such as percentage numbers, can by displayed on the representation of the part, each number corresponding to a line section, being displayed with a visual link to that line section, with the number representing a relative contribution or feature cause contribution associated with that line section.

In embodiments, automatically adapting, based on the line section and the cause trajectory along the line section, parameters of the forming process, comprises:

modifying the process, or the geometry of the part or the tool in a region of the part corresponding to the line section in order to reduce the stress or force along the line section, in particular, by if the region comprises a radius, increasing the radius;

if the region comprises a drawbead, reducing the height and/or increasing any of the radii of the drawbead;

if the region comprises the blank holder, reducing the holding force.

In general, the stress or force can be reduced by reducing friction. This can also be done by changing parameters of use of lubricants, such as the location, quantity and type of lubricant being applied.

The above measures for reducing stresses or forces address thinning effects. For thickening effects, opposite measures can be taken.

A deep draw effect, causing the compression of material, can be reduced by one or more of reducing blank size, adding operations ("reduction draw"), and changing part geometry, in particular wall angles.

In embodiments, the method comprises modifying the geometry of the part or the tool in a region of the part corresponding to a trajectory section in which the stress or force builds up (when getting closer nearing the defect) or, respectively, is reduced (when moving away from the defect). The trajectory section can be identical to the entire cause trajectory. A corresponding line section thus can be identical to a corresponding entire main section.

In embodiments, it can be the case that cause lines diverge from each other, leading to different features. In this case, relative contributions of such diverging cause lines can be determined.

A method for designing a tool for manufacturing a part comprises performing the method steps presented herein for analysing a result of a simulation of a manufacturing process in which the part is manufactured at least once, modifying a model defining the desired geometry of at least one of the part and the tool and the process depending on an outcome of the analysis, and manufacturing the tool for manufacturing the part as defined by the modified model.

A method for designing a part to be manufactured using a tool comprises performing the method steps presented herein for analysing a result of a simulation of a manufacturing process in which the part is manufactured at least once, modifying a model defining the desired geometry of at least one of the part and the tool depending on an outcome of the analysis, and manufacturing the part as defined by the modified model.

A data processing system is programmed to execute a procedure according to the method steps presented herein.

A computer program product loadable into an internal memory of a digital computer, comprises computer program code means to make, when said program code is loaded in the computer, the computer execute a procedure according to the method steps presented herein.

A method of manufacturing a non-transitory computer readable medium, comprises the step of storing, on the computer readable medium, computer-executable instructions which when executed by a processor of a computing system, cause the computing system to perform the method steps presented herein.

In still another embodiment, the computer program is embodied as a reproducible computer-readable signal, and thus can be transmitted in the form of such a signal.

Further embodiments are evident from the dependent patent claims. Features of the method claims may be combined with features of the device claims and vice versa.

DESCRIPTION OF THE DRAWING

The subject matter of the invention will be explained in more detail in the following text with reference to exemplary embodiments which are illustrated in the attached drawing, which schematically shows.

In principle, identical or functionally identical parts are provided with the same reference symbols in the figures.

DETAILED DESCRIPTION

Figure 1:
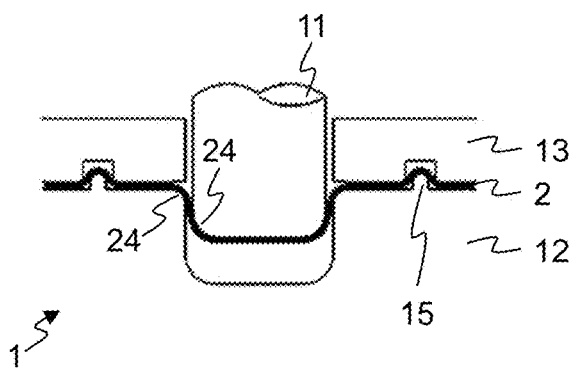
FIG. 1 a tool for forming a part by deep drawing.

FIG. 1 shows a tool 1 for forming a part 2, the tool 1 comprising a punch 11, a die 12 and a blank holder 13. The part 2 is held against the die 12 by means of the blank holder 13. The tool 1 is arranged in a forming press, not shown. During the forming operation, the part 2 is held between the die 12 and the blank holder 13, the punch 11 is moved towards the die 12, or vice versa, and the part 2 is formed according the shape of the tool 1. This involves pulling and stretching the part 2 over radii 24 of the tool 1. In order to control the flow of the part material, drawbeads 15 can be arranged at the periphery of the tool 1, holding back the flow of material. The tool shown corresponds to a deep drawing forming operation, but the analysis method described herein is applicable to other forming methods and assembly methods too. The shape of the part 2 is not uniquely determined by the shape of the tool 1, but is also determined by effects such as springback, thickening and thinning of the material by the forming process, etc.

Figure 2:
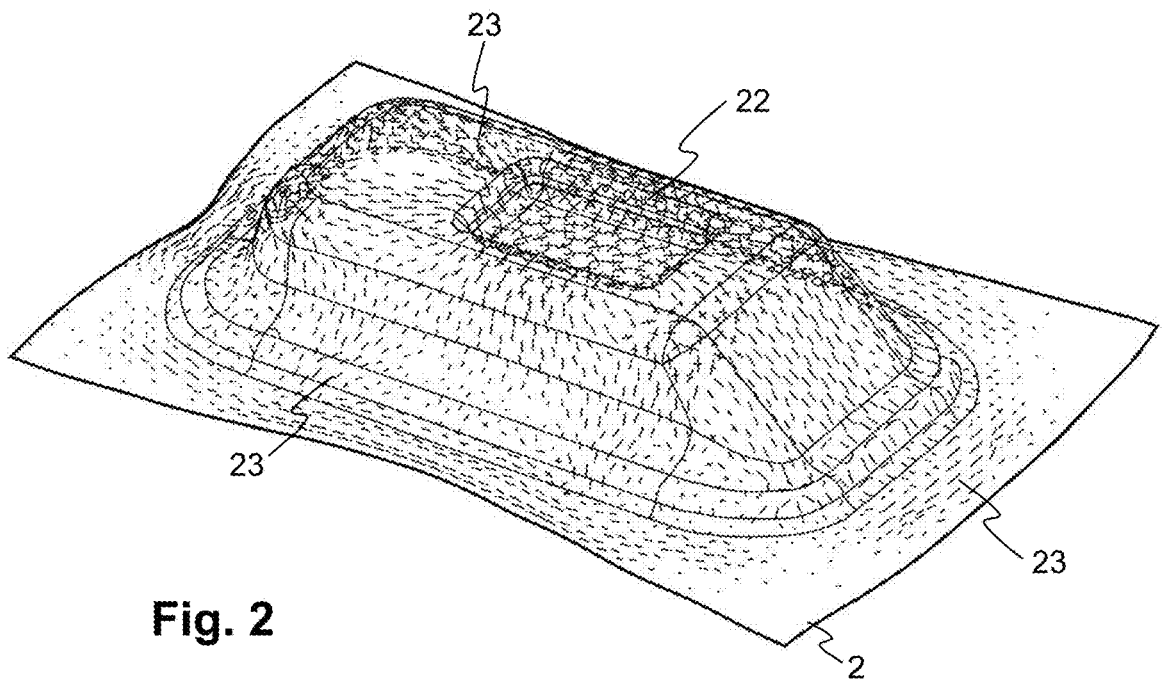
FIG. 2 a part after a forming process, with stress directions.

FIG. 2 shows the part 2 after a forming process, or after a part of the forming process has been performed. The forming process typically is a forming operation by which the part 2 is shaped in the tool 1. The forming operation can comprise a single forming step or a sequence of forming steps.

In order to analyse and improve the design of the part 2, represented by its geometry, and thereby also the geometry of the tool 1 and parameters of the forming process, the forming operation is simulated. The simulation determines the change in geometry from a sheet metal blank to the geometry of the formed part, and corresponding changes in the state of the material of the part. The simulation can be based on only the geometry of the part, and/or on the shape (or geometry) of the elements of the tool 1 and operating parameters of the tool.

Methods for such simulations are generally known. They typically but not necessarily are FEM (Finite Element Method), wherein the part is modelled as comprising a finite number of material points arranged in a grid or mesh, and the behaviour of the part is determined for each of these material points, also called simulation points. The simulation can involve forward simulation, single step simulation and the like.

Results of such a simulation can include a state of the material during and after the forming operation, and the geometry of the part, that is, the shape of the part. The state can comprise stresses of the material in each simulation point, and other state variables such as strain, temperature, and friction forces acting on the part.

The results can also comprise a classification of certain areas of the part 2 being prone to defects. In production of the real part, defects exceeding a certain severity are to be avoided. Defects can be, for example, splits in the material, or wrinkles. Regions of the part 2 in which a defect is likely to occur can be determined based on the state of the part 2 during or after the forming process. Corresponding methods are known. Such regions shall be called critical regions 22.

Critical regions 22 can be found as being regions in which there is a significant probability that a defect with a certain severity will occur. This can be done, among others, by analysing the results of the simulation with regard to thinning effects and thickening effects. Typically, splits can be determined by means of a forming limit curve in a forming limit diagram (FLD). Typically, wrinkles can be determined by a geometric analysis.

Critical regions can be determined as the simulation progresses, and the subsequent analysis can be based on the state of the part before the onset of a defect. The state of the part then corresponds to part of the forming process having been performed.

The term "thickening effects" is used in the present application as a summary for the effects of a (locally) too small restraining force, such effects being, with increasing order of severity: insufficient stretching, compression, thickening of the sheet metal material. Corresponding regions of the part, in which such effects are expected to occur, according to the simulation, are called risk regions related to thickening. Note that the term "thickening effects" does not necessarily mean that the material becomes thicker in each case; in particular it also includes thinned regions with insufficient stretching or with compression.

The term "thinning effects" is used in the present application as a summary for the effects of a (locally) too large restraining force, such effects being, with increasing order of severity: risk of splitting, excessive thinning, tearing or splitting of the sheet metal material. Corresponding regions of the part, in which such effects are expected to occur, according to the simulation, are called risk regions related to thinning. Note that the term "thinning effect" does not necessarily mean that the material becomes thinner in each case; in particular it also includes cracks in thickened regions.

In embodiments, a region is considered to be a critical region 22 if the material is stretched less than a given minimal value, for example, 5%. Such a requirement can be specified in order to achieve a certain surface quality of the part.

In order to assess the cause of a particular defect, the actual occurrence of this defect is not simulated, because this would correspond to releasing the simulated forces built up along the cause lines 3, making them disappear. In embodiments, the state of the simulation of a forming process is used as it is just before a simulated defect actually occurs, and the causes for the defect in the corresponding critical region 22 are determined. This can be repeated for different defects occurring at different times in the forming process. When a defect occurs, the stress relieving occurring in the materiel, for example, due to a split, can be simulated.

In many cases, defects can are related to the forces acting within the material (internal forces) in a critical region 22. These forces are caused by forces acting on the part (external forces) in other regions of the part 2. The method presented herein serves to determine where the external forces (acting on the part) are generated and how and to what extent they contribute to the internal forces (acting within the material) at the critical region 22. It can also serve to determine internal forces, such as a deep draw effect force, as explained further down.

In order to do so, the method considers stresses within the material. The stress in each simulation point of the material can be represented by a stress tensor. The stress tensor in turn can be represented, in a corresponding coordinate system, by principal stresses, that is, a major stress and two orthogonal minor stresses (in a 3-D representation of the part behaviour) or one orthogonal minor stress (in a 2-D representation).

Figure 3:
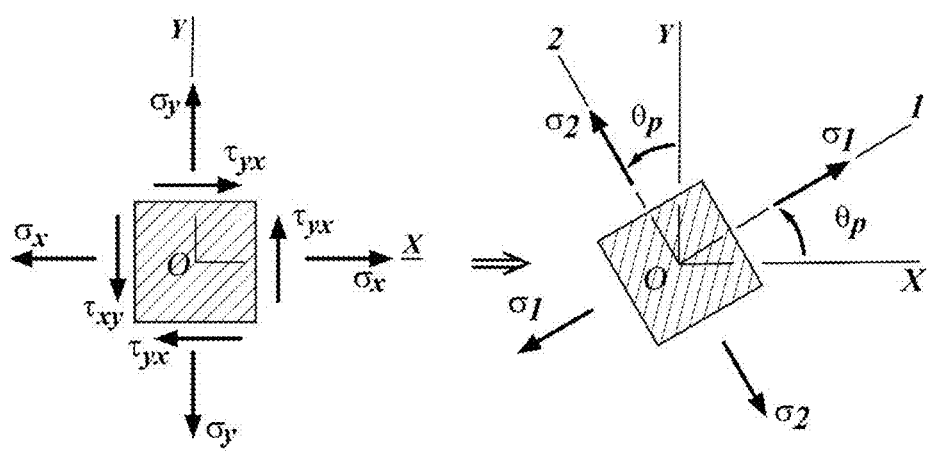
FIG. 3 normal stresses σ and shear stresses τ in a given coordinate system, principal stresses and their directions.

FIG. 3 shows, for a 2-D representation, normal stresses $\sigma$ and shear stresses $\tau$ in a given coordinate system (with axes denoted x and y), which according to Cauchy's stress theorem can be represented by principal stresses $\sigma 1$ and $\sigma 2$ in a rotated coordinate system. In the rotated system, the larger of the principal stresses $\sigma 1$ and $\sigma 2$ is called the major stress, and the corresponding direction is called the major stress direction.

In FIG. 2, the representation of the part 2 is overlaid with lines or arrows indicating the direction of principal in-plane forces, that is, of the major and minor in-plane forces in the part 2. If the part 2 is modelled as a two-dimensional sheet, then these directions are identical to major and minor stress directions in the part 2. If the part 2 is modelled as being three dimensional, with different stresses over the thickness of the part, then in-plane forces are determined as an integral of stresses over the thickness of the part. The relative length of the lines represents the magnitude of the force or stress, respectively. In some points, where the principal forces or stresses are essentially identical, the direction of the two lines is arbitrary, since the force or stress in every direction has the same value.

Figure 4:
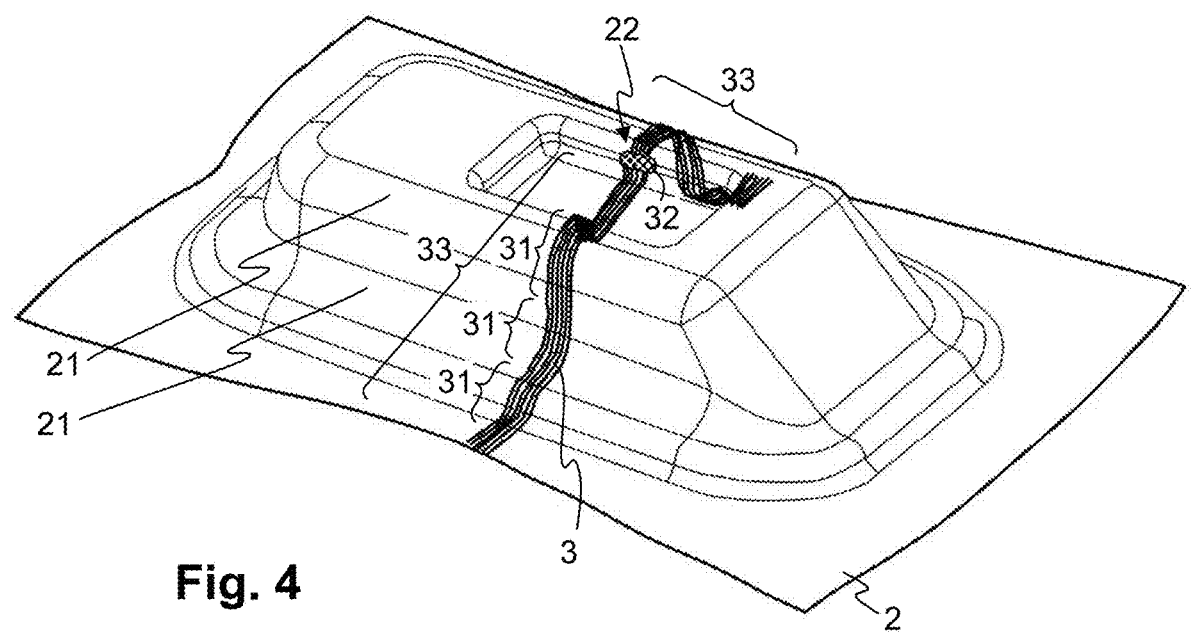
FIG. 4 the part of FIG. 2, with cause lines related to a critical region.

In order to determine the origin of internal forces acting in a critical region 22, the method begins at a starting point 32 within the critical region 22 (see FIG. 4). It determines a first point of a cause line 3 by following the major stress direction of the starting point 32 for a step distance. From the first point, it determines a second point by following the major stress direction of the first point. This procedure is repeated iteratively for further points until, for example, an edge of the part 2 is reached, or if a region is reached in which the stress is zero. The step size can be, for example, constant, or depend on the local geometry of the part, or depend on the local mesh size of the FEM model. The result of the procedure shall be called a cause line 3.

If a point is reached in which there is no clear major stress, that is, the principal stresses are essentially identical, then the direction of the previous step can be used as a basis for determining the next point of the cause line 3.

FIG. 4 shows the part 2 of FIG. 2, with several cause lines 3 shown, originating from different starting points 32. The cause lines 3 can be shown with varying line features, such as colour or thickness, along their length, indicating the magnitude of the major stress along the respective cause line 3. This would be the case, for example, on a user interface display.

Beginning with the starting point 32, there are two directions in which the procedure may proceed. Each of these directions gives rise to a main section 33 of the cause line 3 through this starting point 32. The two main sections 33 indicate the source of forces that act from opposite sides on the starting point 32, causing the stress in the starting point 32.

The procedure described above can be repeated for several other starting points 32 in the same critical region 22.

Figure 5:
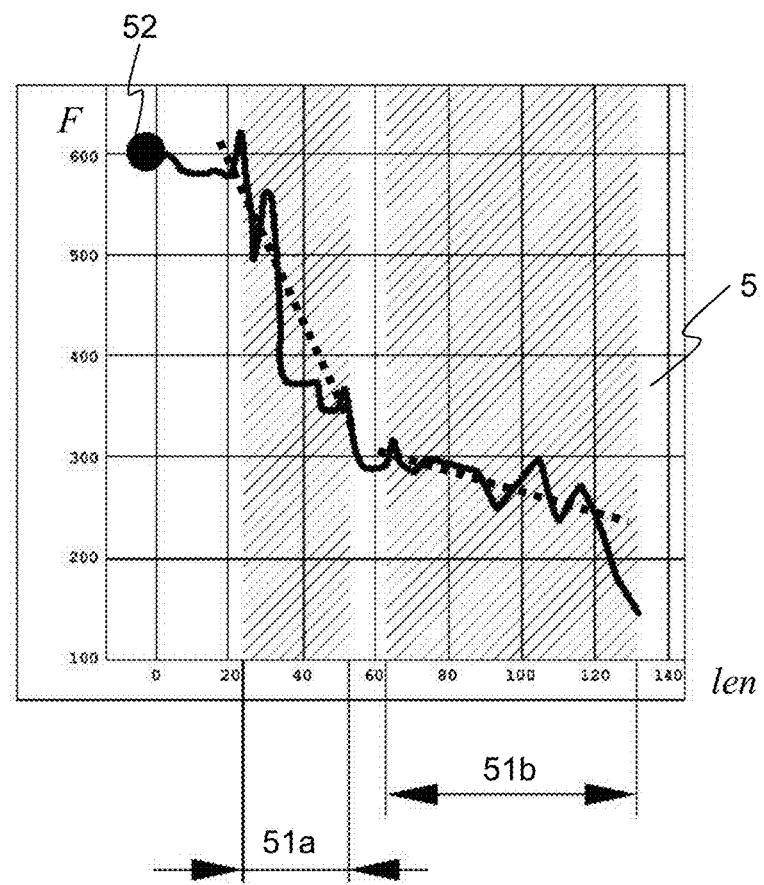
FIG. 5 a stress or force trajectory along a cause line.

FIG. 5 shows, for a single cause line 3, and for one of its main sections 33, a stress or force trajectory 5 along the length of the main section 33 of the cause line 3. The trajectory 5 shows the stress or the force that acts along the length len of the cause line 3. If the part 2 is modelled as a two-dimensional sheet, then the major stress at a particular location on the line, multiplied by an area at which the stress acts, defines the force acting on this area in the direction of the cause line 3. If the part 2 is modelled as being three dimensional, then the force is determined as an integral of stresses over the thickness of the part. The trajectory 5 representing the forces is therefore at least approximately equivalent to the trajectory 5 representing the stresses. In the following, the term cause trajectory 5 shall be used to refer to either a stress or a force trajectory. The analysis of the trajectory shall be explained in some cases with reference only to force or only to stress, but it is understood that the explanations can refer to the other entity as well.

The cause trajectory 5 begins at a point associated with a defect 52. The graph of the trajectory 5 corresponds to one main section 33 of the cause line 3. The stress, or force, depending on circumstances, is largest at the point of the defect 52 and generally decreases with the distance len along the cause line 3. Each location along the length of the cause line 3 can be associated with a geometrical feature 21 of the part 2 and a corresponding feature of the tool 1 that is used for forming the part, such as blank holder 13, radii 24 and drawbeads 15. Generally, such tool features are discussed with reference to the resulting geometry of the part 2. Conversely, when writing about the blankholder, radii and drawbeads in the context of the part, it is understood that this can relate to the shape of the part as it is generated by these tool features.

Given information about the location of these (tool or part) features, which can be derived from a given computer readable model of the part 2 or the tool 1, line sections 31 of the cause line 3 can be determined, each line section 31 being associated with a particular feature. Each line section 31 can be mapped to a corresponding trajectory section 51 of the trajectory 5.

This makes it possible to determine possible causes for defects in the critical region 22 and to associate them with the features of the part 2 or tool 1: the difference between the stresses or forces at the beginning and the end of a line section 31 associated with a particular feature represents the magnitude of the force acting on the critical region 22 caused by this feature. This sum can be called a feature cause contribution associated with this feature. The cause contribution can be expressed in terms of the stress or of the force contributed by this feature.

In the example of FIG. 5, a first trajectory section 51a corresponds to a radius around which the material of the part is bent and stretched. The main effect of the radius with respect to possible defects (splits, wrinkles) is that it obstructs the flow of material, which in turn builds up stresses or forces. A second trajectory section 51b corresponds to the region of the blank holder (this diagram does not correspond to the part shown in FIGS. 2 and 4). It becomes evident that the force (or stress) contributed by the radius is approximately three times the force (or stress) contributed by the blank holder.

The information about trajectories 5 and the feature cause contributions of the features can be used in a variety of ways, for informing a user and/or as input for an optimisation procedure adapting the geometry of the part 2 and the tool 1 and/or parameters of the forming process.

For informing a user, for example one or more of the following can be realised:
Displaying cause lines 3 emanating from a critical region 22, superimposed on a visual representation of a 3-D model of the part 2.
For each feature along a cause line 3, computing the feature cause contribution, and displaying the feature cause contributions of all the features along the cause line 3 to a user.
Labelling, in a visual representation of the part 2, features with associated feature cause contributions. A number in a label and/or a size and/or colour or other visual feature of the label can be adapted according to the value of the feature cause contribution.

Figure 6:
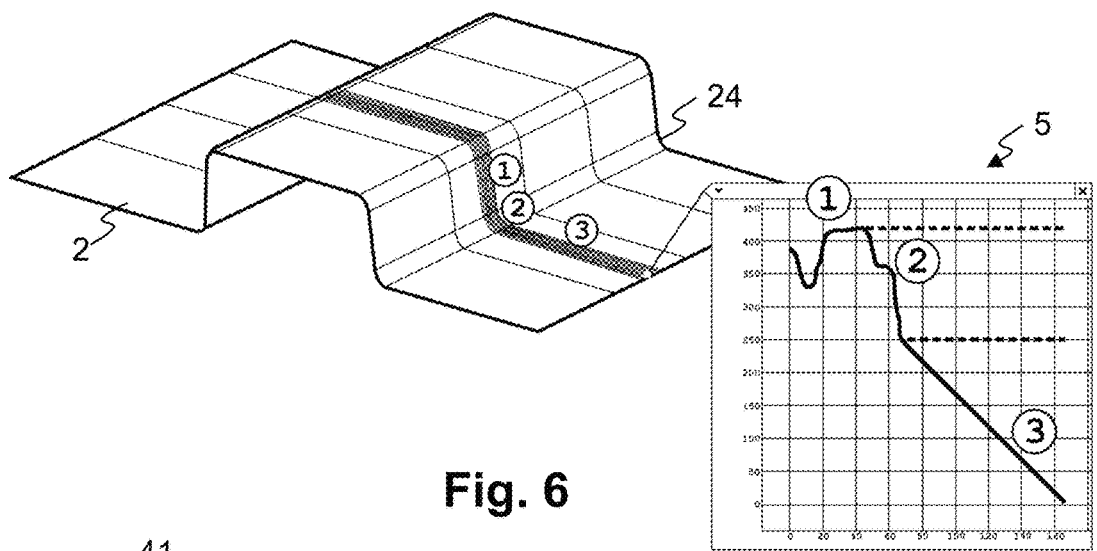
FIG. 6 cause lines and part features associated with trajectory sections.

FIG. 6 shows such a representation: the location of features in a representation of a part, and of corresponding trajectory sections 51 in the cause trajectory 5 is indicated by circled numbers: 1 for a defect or critical region, 2 for a radius, and 3 for a blank holder region.

So far, the method has been described as taking trajectory sections 51 as given, determined by the location of features along the cause line 3, and determining a force or stress contribution associated with individual trajectory sections 51 and corresponding features. An alternative approach is to start with the force or stress trajectory 5, and perform a segmentation of the trajectory 5 into trajectory sections 51 based on the shape of the trajectory 5. The segmentation can involve, for example identifying locations along the trajectory in which the derivative (or gradient) of the trajectory changes, and/or identifying trajectory sections 51 in which the derivative of the trajectory exceeds a certain limit. The trajectory can be filtered before determining the derivative. Thus, based on the trajectory 5, trajectory sections 51 can be identified over which the change in the cause trajectory 5 is relatively large. The trajectory sections 51 identified in this manner are mapped to the cause line 3 and its location on the part 2. This allows to identify regions of the part that contribute to a defect in a critical region 22 without a priori information on the location of part features.

Optionally, features located in such regions of the part can be identified. Then the parameters of such features, depending on an associated feature cause contribution of the region, can be modified in order to reduce the change in stress or force in the region.

For adapting the design of the part 2 and/or the tool 1 and/or the process, typically in an optimisation procedure, for example one or more of the following can be realised:
A user modifying the design using the information about stress or force trajectories 5 and feature cause contributions.
Automatically modifying the design using the information about stress or force trajectories 5 and feature cause contributions.

In embodiments, automatically modifying the design can be done by following rules that relate to parameters of features in the region. For example, in order to reduce the total stress or force acting on the critical region 22 by reducing the cause contribution in a region:
if the region comprises a radius, increase the radius;
if the region comprises a drawbead, reduce the height and/or increase any of the radii of the drawbead;
if the region comprises the blank holder, reduce the holding force.

Given multiple critical regions, certain modifications can alleviate issues in one critical region but create problems in another one. In such cases, alternative modifications need to be considered, and the effects of multiple modifications on multiple critical regions need to be balanced so as to reach an overall optimum. Iterative testing of different modifications by simulation can be used to find such an optimum.

In embodiments, modifying the design can be done by stochastically modifying the geometry and using known methods for stochastic optimisation and/or genetic algorithms and the like.

Modifying the design can comprise modifying the geometry of the part 2, and/or of the tool 1 and/or of the process.

Based on the information extracted in the form of the cause line 3 and optionally associating this information with features, the method can comprise the further computer-implemented steps of optimising the design. Based on an optimised design, corresponding tools can be manufactured. Based on the tools, the real parts 2 can be produced.

Figure 7:
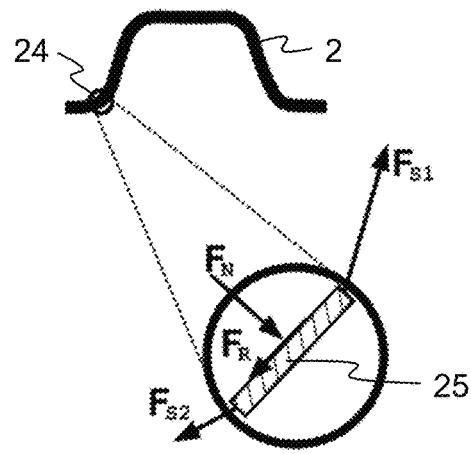
FIG. 7-8 a volume element of the material, with forces related to a deep draw effect.
Figure 8:
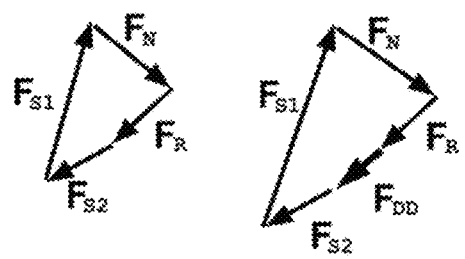

FIGS. 7 and 8 illustrate a possible option for the calculation of the cause trajectory 5. In the embodiments presented so far, the trajectory 5 is determined by plotting the major stresses, or corresponding forces, along the length of the cause line 3. This gives only a two-dimensional view of the evolution of the stresses or forces along the cause line 3. The option is related to the so-called deep draw effect. This addresses the situation where the flow of material causes a section of material to be compressed in a direction that is normal to the major stress direction, along which a cause line 3 runs. This can occur, for example, in a deep drawing process in which a flat sheet metal blank is radially drawn into a forming die by the mechanical action of a punch, forming a cup. At the periphery or rim, the blank is held by the blank holder 13. As the flat blank is transformed into the cup, material flowing from the rim inward into the cup is compressed in a tangential or circumferential direction. This compression gives rise to a further force, acting against the force that pulls the material through the region in which it is compressed, and resisting the inward flow of material. In other words, this force represents the material's resistance to being compressed (in the direction normal to the major stress direction) as the material is forced through this region in the major stress direction. This force is called deep draw effect force.

The deep draw effect force in general can be computed by means of a full simulation of the inner states of the material. This however is computationally intensive. For the present application, the deep draw effect force is estimated from a force balance for an infinitesimal element along the cause line. The element is oriented in the direction of principal stress, such that shear stresses do not need to be accounted for.

Consider an infinitesimal 3D volume element 25 of the material of the part 2, shown in FIG. 7 in a cross section, wherein the volume element is oriented along a cause line 3, that is, in the direction of the major stress at this volume element. The cause line 3 passes through opposing first and second faces (or entrance and exit faces) of the volume element. A normal force $F_N$, acting in a direction normal to the cause line 3 is caused by a section of the tool around which the part is bent.

A first force $F_{s1}$ acting at a first face (or entrance face) is determined by multiplying the stress at the first face with the area of the first face.

A second force $F_{s2}$ acting at a second face (or exit face) is determined by multiplying the stress at the second face with the area of the second face.

The normal force $F_N$ acting in a direction normal to the cause line 3 is determined from the simulation of the forming operation.

A friction force $F_R$ component acting in the direction of the cause line 3 is determined from the normal force $F_N$ and a friction coefficient between the tool and the part.

On a further level of detail, not illustrated, the infinitesimal element can be considered to have trapezoidal shape when seen in the direction of the normal force. Then, forces acting on the inclined faces of the trapezoid have a component in the direction of the cause line, and this component can also be taken into account in the force balance.

If no further forces were to act on the volume element, then the vector sum of these forces must be zero, as shown in the left part of FIG. 8. If the vector sum is not zero, then the discrepancy can be attributed to the deep draw effect force $F_{DD}$, as shown in the right part of FIG. 8. The sum of the forces including the deep draw effect force $F_{DD}$ thus is zero, and the deep draw effect force $F_{DD}$ can be computed from the other four forces.

Given the relative magnitude of the forces, the cause of a particular increase in force $dF_s = F_{s1} - F_{s2}$ over the infinitesimal element along the cause line 3 can be determined. Knowing the cause allows to choose which parameter of the process or which part of the geometry to modify.

If the normal forces $F_N$ and friction $F_R$ act only from one side, then if the deep draw effect force $F_{DD}$ is zero (as in the left part of FIG. 8), then the entire increase in force $dF_s$ is assigned to a radius around which the material is being pulled.

if the deep draw effect force $F_{DD}$ is different from zero (as in the right part of FIG. 8), then the difference $dF_s - F_{DD}$ is assigned to a radius around which the material is being pulled.

If the normal forces $F_N$ from opposite sides do cancel one another, then the other forces are parallel to one another (not illustrated). Then, if the deep draw effect force $F_{DD}$ is zero, then the entire increase in force $dF_s$ is assigned to friction $F_R$ and thus to the blank holder exerting the normal forces $F_N$.

if the friction $F_R$ is zero, then the entire increase in force $dF_s$ can be assigned to the deep draw effect force $F_{DD}$, and the cause of the increase lies with the deep draw force.

if the entire increase in force $dF_s$ is caused in part by the deep draw effect force $F_{DD}$ and in part by the friction $F_R$, then the cause is allocated to the deep draw effect and to blank holder forces in proportion to the relative magnitude of $F_{DD}$ and $F_R$.

For a particular feature, the feature cause contribution is the sum of the increase in force $dF_s$ over the infinitesimal elements along a line section 31 associated with the feature. In the manner shown above, the increase in force can be assigned to different causes related to the feature, and it can be determined to which degree each feature (such as a radius) or parameter (such as a holding force) contributes to a defect. Modifying those parameters or features with the greatest contribution is preferable, since it carries the potential for being most effective.

If the simulation represents the deformation of a part or an assembly, for example, in the event of a crash, then the trajectories of the cause lines can serve to modify the geometry of the part or assembly to strengthen certain parts, and/or to modify the trajectory or cause lines and/or to move peaks to other locations along the stress lines.

If the simulation represents an assembly process, then the trajectories of the cause lines can serve to modify the geometry of the part or assembly.

Figure 9:
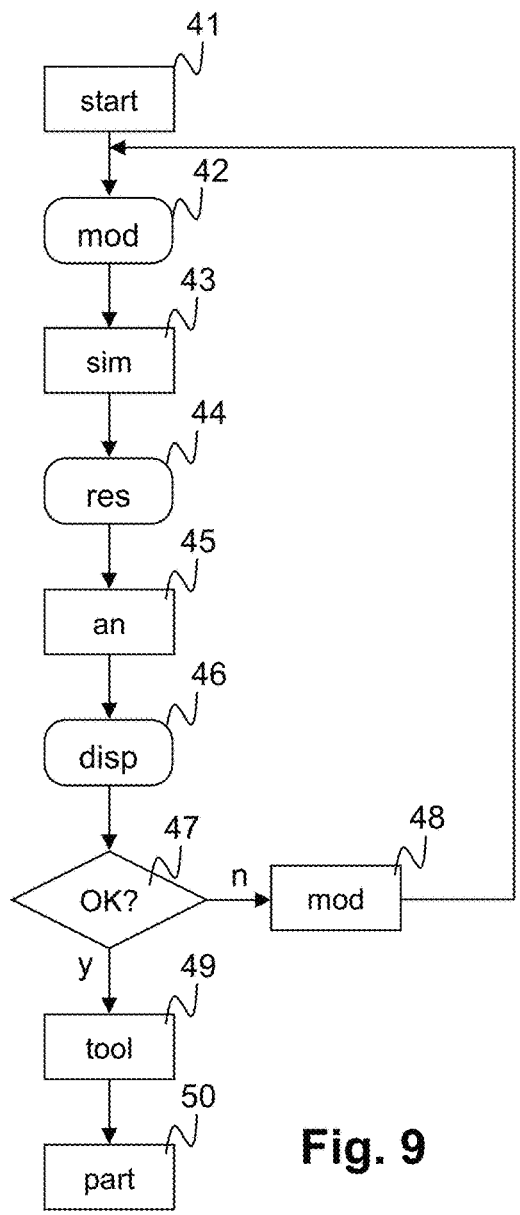
FIG. 9 a flow diagram of an analysis method as presented herein.

FIG. 9 shows a flow diagram of a method that incorporates the analysis method presented herein: in an initialisation step 41, a model 42 defining the desired geometry of a part 2 and/or of the tool 1 and the process used to manufacture the part 2 is created. In a simulation step 43, a forming, or, more generally, a manufacturing process for creating the part 2 is simulated, with a result model 44, typically in the form of a FEM model, of the part 2 after the forming or manufacturing process.

In an analysis step 45, the analysis as presented herein is performed. Analysis results 46 are stored or displayed to a user. Based on the analysis results, a decision 47 is taken, by the user or by an automated process, to either perform a modification 48 of the model 42 of the part and/or the tools and/or the process, and repeat the procedure iteratively, or to stop the execution of the method. The modification 48 itself can be performed by a user, based on the analysis results. Modifying the tool can comprise, for example, modifying the shape, modifying the clearance between punch and die, modifying holding forces, the location and size of draw beads, etc. The method can continue by manufacturing 49 the real tool 1 according to the possibly modified process, and optionally also by subsequently producing 50 the real part corresponding to the design defined by the initial model 42.

While the invention has been described in present embodiments, it is distinctly understood that the invention is not limited thereto, but may be otherwise variously embodied and practised within the scope of the claims.

The invention claimed is:

1. A computer-implemented method for analysing a result of a simulation of a manufacturing or deformation process in which a part is manufactured or deformed using a tool, in particular from a planar sheet of material, the method comprising the computer-implemented steps of retrieving the result of the simulation of the manufacturing or deformation process, the result comprising at least the geometry of the part, stress tensors in the part caused by the forming process, and a critical region in the geometry of the part caused by the forming process;

for one or more starting points in the critical region, determining a cause line, the cause line being a line within an FEM model of the geometry of the part, by beginning at the starting point and iteratively moving along the geometry of the part from one point on the cause line to a next point on the cause line by moving, at each point of the cause line, in the direction in which the stress, as defined by the stress tensor in this point, or a corresponding force, is maximal or in which the stress or force is minimal;

for each cause line, determining at least one line section of the cause line, and a cause trajectory associated with the line section, the cause trajectory representing in particular values of a stress or a force directed along the cause line in the line section;

thereby determining the line section to be a cause for a defect that is located in the critical region on the geometry of the part;

and for the at least one line section, performing at least one of presenting information representing the line section and the cause trajectory along the line section to a user; and automatically adapting, based on the line section and the cause trajectory along the line section, the forming process, in particular the geometry of at least one of the part and the tool, performing a further simulation of the forming process, and iteratively repeating the above steps with the results of the further simulation of the forming process.

2. The method of claim 1, comprising determining a cause line by moving, at each point along the cause line, in the direction in which the stress, as defined by the stress tensor in this point, or the corresponding force, is maximal.

3. The method of claim 1, comprising determining a cause line by moving, at each point of the cause line, in the direction in which the stress, as defined by the stress tensor in this point, or the corresponding force, is minimal.

4. The method of claim 2, wherein, when moving along the cause line, a point is reached in which there is no clear direction of maximal stress or force, then determining the next point by moving in at least approximately the same direction as in the preceding step.

5. The method of claim 1, wherein the step of for each cause line, determining at least one line section of the cause line comprises selecting at least one feature of the part, and determining the line section as a section of the cause line that lies in a region of the part in which said feature is located.

6. The method of claim 1, wherein, the step of for each cause line, determining at least one line section of the cause line comprises determining the cause trajectory, performing a segmentation of the cause trajectory into trajectory sections based on changes in the gradient, and determining, for each trajectory section a corresponding line section.

7. The method of claim 1, wherein the result of the simulation of the manufacturing or deformation process is obtained by performing the simulation at least until a simulated defect occurs, and taking the state of the part just before the simulated defect occurs as the result of the simulation for the subsequent steps.

8. The method of claim 1, comprising computing a deep draw effect force $F_{DD}$ acting on a volume element on a cause line in the part as a vector sum of a first force acting at a first face of the volume element in the direction of the cause line, a second force acting at a second face of the volume element in the direction of the cause line, a normal force acting in a direction normal to the cause line, a friction force acting in the direction of the cause line and caused by the normal force.

9. The method of claim 1, wherein presenting information representing the line section and the cause trajectory along the line section to a user comprises displaying a visual representation of values of the cause trajectory overlaid on a visual representation of the part.

10. The method of claim 1, wherein presenting information representing the line section and the cause trajectory along the line section to a user comprises displaying a visual representation of values of the cause trajectory separately from a visual representation of the part, and displaying visual elements that relate regions on the part to trajectory sections of the cause trajectory.

11. The method of claim 1, wherein automatically adapting, based on the line section and the cause trajectory along the line section, parameters of the forming process, comprises modifying the process, or the geometry of the part or the tool in a region of the part corresponding to the line section in order to reduce the stress or force along the line section.

12. A method for designing a tool for manufacturing a part, comprising performing the steps claim 1 for analysing a result of a simulation of a manufacturing process in which the part is manufactured at least once, modifying a model defining the desired geometry of at least one of the part and the tool and the process depending on an outcome of the analysis, and manufacturing the tool for manufacturing the part as defined by the modified model.

13. A method for designing a part to be manufactured using a tool, comprising performing the steps of claim 1 for analysing a result of a simulation of a manufacturing process in which the part is manufactured at least once, modifying a model defining the desired geometry of at least one of the part and the tool depending on an outcome of the analysis, and manufacturing the part as defined by the modified model.

14. A non-transitory computer-readable medium comprising a computer program product loadable into an internal memory of a digital computer comprising computer program code means to make, when said program code is loaded in the computer, the computer execute the method according to claim 1.

15. A method of manufacturing a non-transitory computer readable medium, the method comprising the step of storing, on the computer readable medium, computer-executable instructions, wherein the computer-executable instructions, when executed by a processor of a computing system, cause the computing system to perform the method steps of claim 1.

16. The method of claim 1, wherein automatically adapting, based on the line section and the cause trajectory along the line section, parameters of the forming process, comprises
    modifying the process, or the geometry of the part or the tool in a region of the part corresponding to the line section in order to reduce the stress or force along the line section, by one or more of
        if the region comprises a radius, increasing the radius;
        if the region comprises a drawbead, reducing the height and/or increasing any of the radii of the drawbead;
        if the region comprises a blank holder, reducing the holding force;
        reducing friction, in particular by changing parameters of use of lubricants.

* * * * *